May 13, 1941.  H. ERNST ET AL  2,241,637
DYNAMIC BALANCING MECHANISM FOR MACHINE TOOLS
Filed May 17, 1938   3 Sheets-Sheet 1
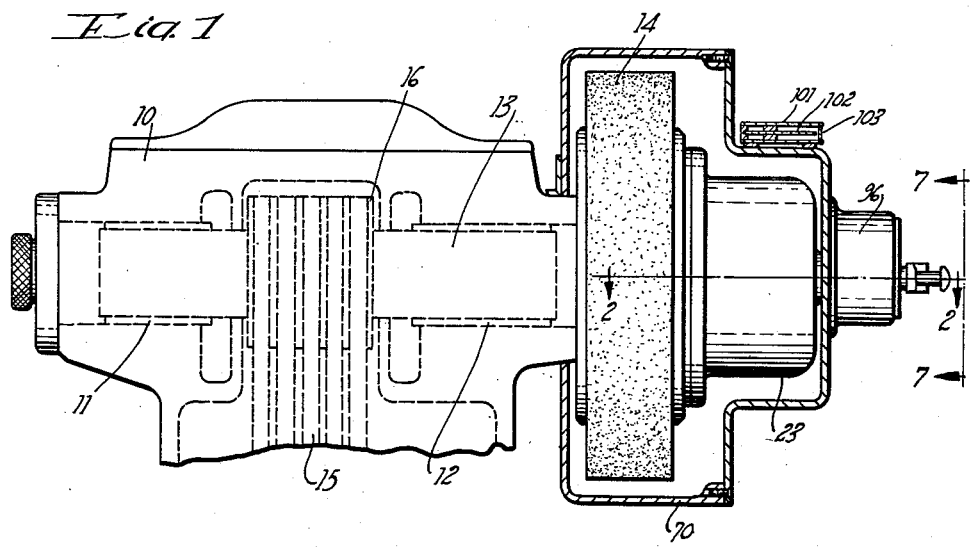
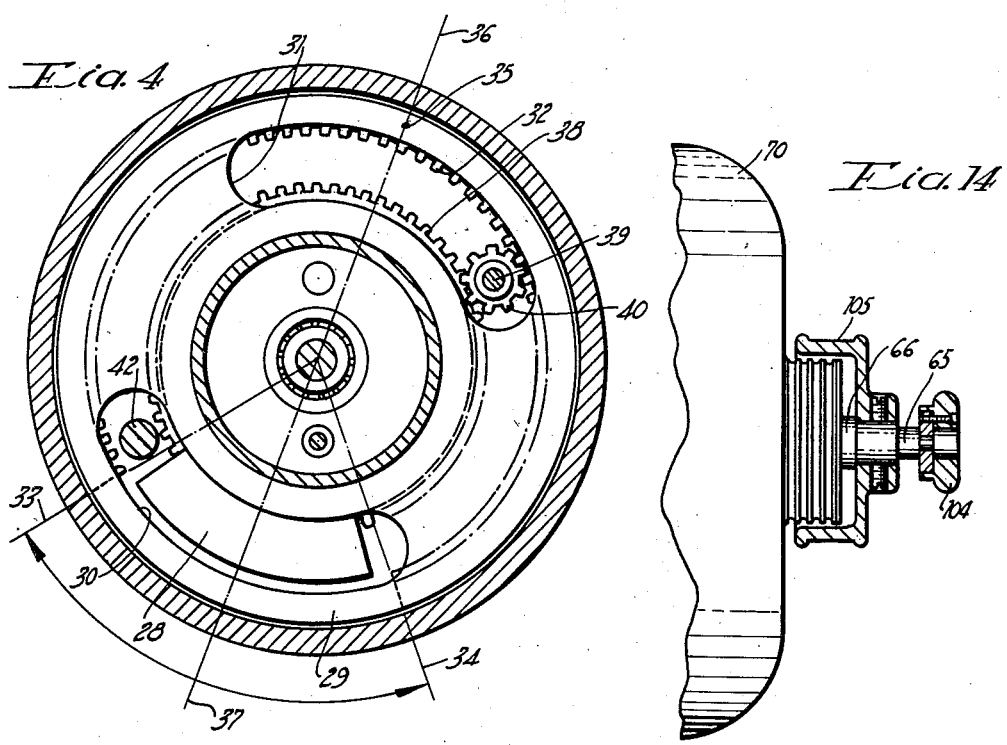
INVENTOR.
HANS ERNST
ALBERT H. DALL
BY
AHK Parsons
ATTORNEY.

May 13, 1941.  H. ERNST ET AL  2,241,637
DYNAMIC BALANCING MECHANISM FOR MACHINE TOOLS
Filed May 17, 1938   3 Sheets-Sheet 2
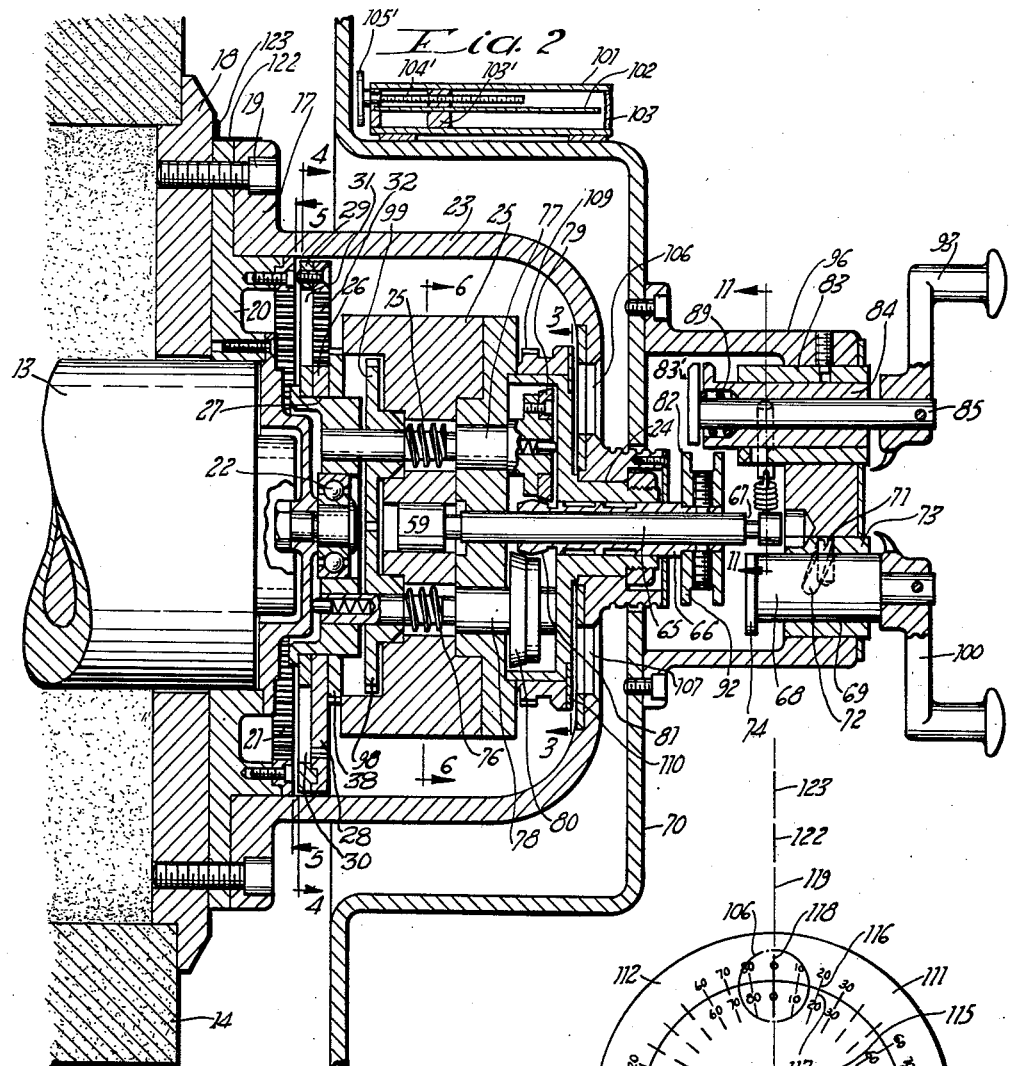
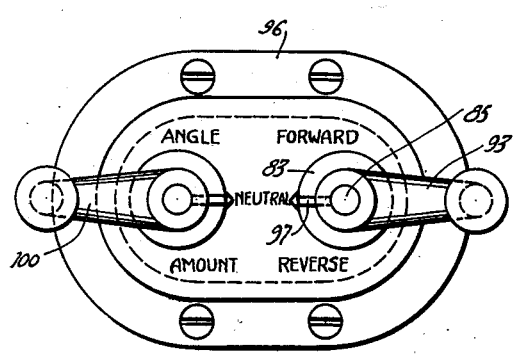
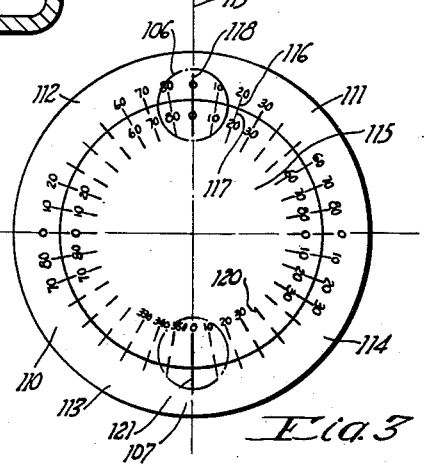
INVENTOR.
HANS ERNST
ALBERT H. DALL
BY
*Parsons*
ATTORNEY.

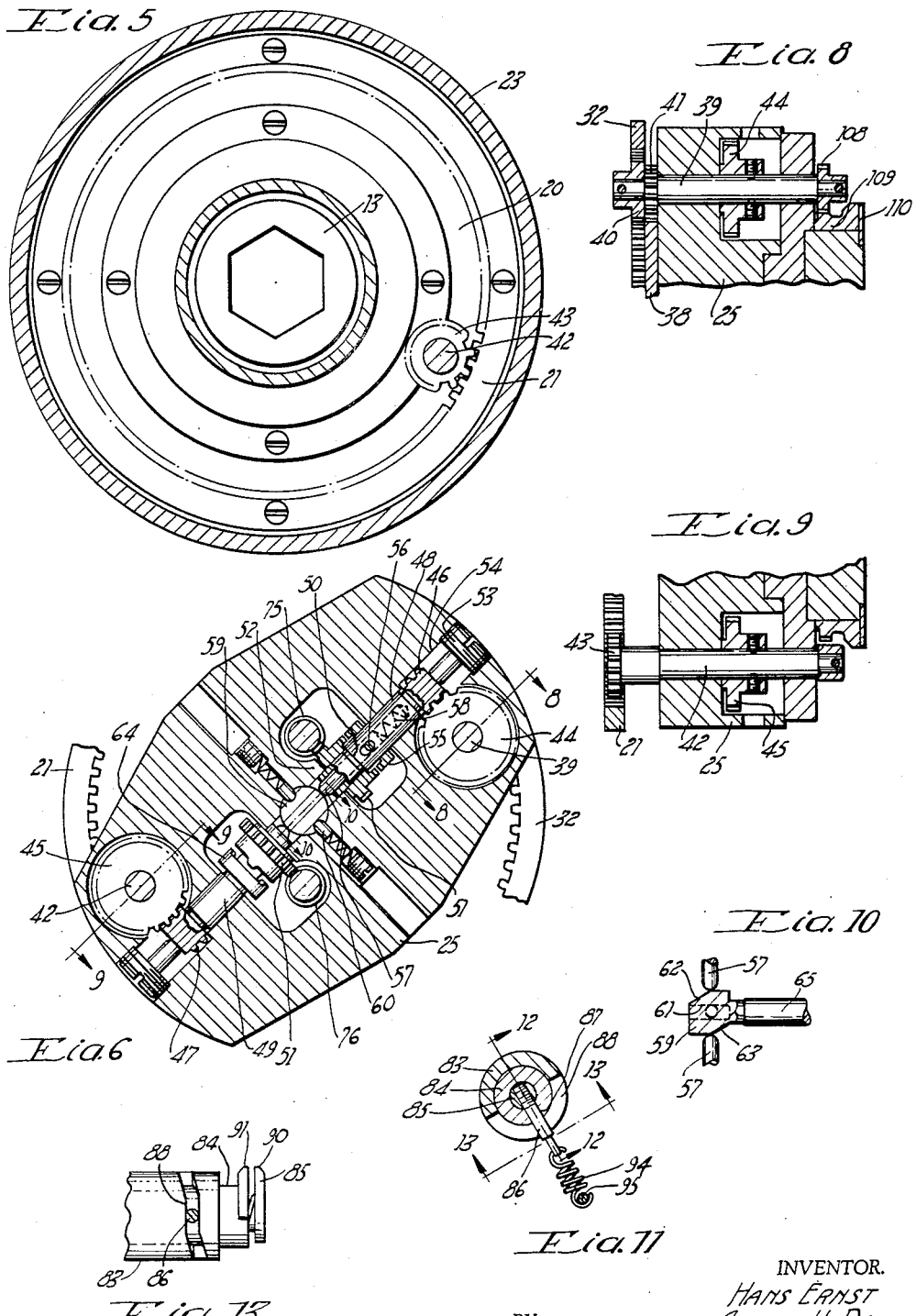

Patented May 13, 1941

2,241,637

UNITED STATES PATENT OFFICE 2,241,637

DYNAMIC BALANCING MECHANISM FOR MACHINE TOOLS

Hans Ernst, Cincinnati, and Albert H. Dall Silverton, Ohio, assignors to Cincinnati Grinders Incorporated, Cincinnati, Ohio, a corporation of Ohio Application May 17, 1938, Serial No. 208,443

8 Claims. (Cl. 73—53)

This invention relates to machine tools, and more particularly to improved means for dynamically balancing a rotatable member thereof.

One of the objects of this invention is to provide an improved dynamic balancing mechanism for a rotatable member of a machine tool.

A more specific object of this invention is to provide improved means for quickly and accurately dynamically balancing the grinding wheel of a grinding machine.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 1 is a partial view in elevation of a machine tool showing a grinding wheel which is to be balanced.

Figure 2 is an enlarged sectional view taken on the line 2—2 of Figure 1, and showing the balancing mechanism and controls therefor.

Figure 3 is a detail view on the line 3—3 of Figure 2.

Figure 4 is a sectional view on the line 4—4 of Figure 2.

Figure 5 is a sectional view on the line 5—5 of Figure 2.

Figure 6 is a sectional view on the line 6—6 of Figure 2.

Figure 7 is an end view of the controls as viewed on the line 7—7 of Figure 1.

Figure 8 is a detail section on the line 8—8 of Fig. 6.

Figure 9 is a detail section on the line 9—9 of Figure 6.

Figure 10 is a detail section on the line 10—10 of Figure 6.

Figure 11 is a section on the line 11—11 of Figure 2.

Figure 12 is a detail section on the line 12—12 of Figure 11.

Figure 13 is a detail view on the line 13—13 of Figure 11.

Figure 14 is a detail view showing a modified form of control mechanism.

In Figure 1 of the drawings, there is shown a portion 10 of a machine tool frame having spaced bearings 11 and 12, in which a spindle 13 is rotatably mounted for supporting a grinding wheel 14 for rotation. The rotation may be effected by a series of power actuated multiple belts 15 passing over a multiple groove pulley 16 secured to the spindle 13 intermediate its bearings.

This invention deals with a mechanism for dynamically balancing a rotatable member of a machine tool which in the present instance is exemplified by the grinding wheel 14. The balancing mechanism constituting this invention may be permanently attached to the grinding wheel whereby, at any time that the wheel becomes out of balance for any reason it may be rebalanced; or the mechanism may be detachably connected to the grinding wheel for determination of the angle and amount of unbalance, and then removed to permit the addition or removal of the desired amount of weight to place the wheel in balance.

Referring to Figure 2 of the drawings, the mechanism comprises a frame 17 which may be detachably or permanently connected to the flange 18 of the grinding wheel by bolts 19 which pass through the frame and are threaded in the flange. The frame includes a plate portion 20 to which is attached an internal annular gear 21. The plate carries an antifriction bearing 22 which is positioned in coaxial relationship to the axis of the spindle 13. The frame also includes a cylindrical portion 23 which is attached at one end to the plate 20 and closed at the other end to form a bearing 24. A rotatable member 25 is supported for rotation on the antifriction bearing 22 and the bearing 24. It is thus possible to rotate the member 25 angularly relative to the frame 17.

In view of the fact that under ordinary conditions interengagement of worm gear 45 and worm 47 prevents rotation or spinning of pinion 43 with respect to carrier 25, the parts in question form a key or lock directly connecting the carrier 25 with the member 21 and thus the grinding wheel for rotation simultaneously therewith.

The rotatable support 25 carries two balancing weights together with mechanism for effecting power adjustment to change the angular relationship between them and thereby determine the amount or value of the balancing component, and additional mechanism for changing the angular position of the resultant component of the two weights relative to the heavy side of the wheel. One weight consists of a disc 26 which is rotatably mounted on a hub 27. At one point on its periphery, the disc has an enlarged sector shaped portion 28, as more particularly shown in Figure 4. Since the disc 26 is evenly balanced, the sector shaped portion 28 may be considered a balancing weight.

A second disc 29 is mounted on the hub 27, and has two cutaway portions 30 and 31 which are located diametrically opposite one another whereby the disc 29 is balanced. This disc carries a ring gear 32 attached to its periphery. The ring gear, however, has a portion between the radius 33 and the radius 34 which is removed, as indicated in Figure 4, whereby the two parts combined have a heavy side diametrically opposite the cutaway portion and this is indicated by the point 35. The disc 29 and attached gear 32 may thus be considered as a second weight with a radial component acting along the radius 36.

When the parts are in the position shown in Figure 4, the radial component 37 of the sector 28 is diametrically opposite the radial component 36, and since the radial components are made equal, it will be understood that the parts are in balance. The internal gear 32 is utilized for effecting angular adjustment of the component 36, and a gear 38 is attached to the disc 26 for effecting angular adjustment of the component 37.

Referring to Figure 8, a shaft 39 is journaled in the support 25 and carries two gears 40 and 41, the gear 40 intermeshing with the internal gear 32, and the pinion 41 meshing with the external gear 38. It will now be evident that if the shaft 39 is rotated in one direction, that the components 36 and 37 will angularly approach one another, and upon rotation in an opposite direction, the components will separate.

When the components 36 and 37 are diametrically opposite, as shown in Figure 4, it will be evident that the resultant component has a "0" value, and that as the components approach one another the value of the resultant component increases until it reaches a maximum value, at which time the components 36 and 37 will be juxtapositioned.

Thus, rotation of the shaft 39 determines the subtending angle between the weights, from which can be computed the value of the resultant component which in practice would be the weight of material to be added to the slight side of the wheel to counterbalance the heavy side. Since the centrifugal force for each component can be computed, and since the value of each weight and its radial distance from the center is a constant, the value of the resultant component will vary in accordance with variation of the cosine of the angle subtended by the weights. By providing means to indicate the value of this angle in any given case, the value of the resultant component can be computed by known mathematical formulae.

The rotatable support 25 carries a second shaft 42, Figure 9, which has a gear 43 attached to the end thereof and intermeshing with the internal ring gear 21 carried by the frame. It will be noted from Figure 4 that the shaft 42 passes through the opening 30 of the disc 29. This opening has an angular extent slightly greater than 90° whereby the disc 29 may be rotated in a clockwise direction, as viewed in Figure 4, through an angle of 90° without interference. This will be sufficient when it is recalled that when the member 29 is rotated 90° in a clockwise direction and the disc 26 rotated 90° in a counterclockwise direction, that the components 36 and 37 will coincide and produce the maximum resultant components. The combination of the opening 30 and shaft 42 serves as means to confine the movement of the weights to certain arcs.

The shafts 39 and 42 have worm gears 44 and 45 attached respectively thereto, and the worm gear 44, as shown in Figure 6, is rotated by a worm 46, while the worm gear 45 is rotated by a worm 47. The worms 46 and 47 are integral with coaxial shafts 48 and 49 respectively. Each of the shafts 48 and 49 has a shoulder 50 formed thereon and a worm gear 51 is mounted between this shoulder and a boss 52 on the member 25. The parts are held in this position by a plug 53 threaded in the end of the bore 54 containing the worm 46. The worm gear 51 is capable of free rotation relative to the shaft but is capable of being clutched to the shaft by a clutch member 55 which is reciprocably mounted on the shaft and has a pin connection 56 with a plunger 57. The pin 56 passes through an elongated hole in the shaft whereby the clutch may move relative to the shaft. A spring 58 continuously urges the plunger 57 in a direction to cause clutch engagement.

The plungers 57 project beyond the end of shafts 48 and 49 into engagement with a shiftable clutch control member 59. This member is held against rotation by a pair of spring pressed plungers 60 which are located 180° apart and which engage elongated grooves 61 formed on opposite sides of the clutch control member. The clutch control member has a central position, as shown in Figure 10, in which both of the plungers 57 are held in a clutch disengaging position. When it is moved to the right of this position, a beveled face 62 permits one of the plungers 57 to move axially, and cause engagement of the clutch member 55; and when moved to the left, a beveled face 63 permits the clutch member 64 to be engaged.

As shown in Figure 2, the clutch control member 59 has an integral elongated control shaft 65 which passes through and beyond the end of a sleeve 66, and in the projecting end thereof is formed an annular groove 67 which is adapted to be engaged by a shifter 68.

The shifter 68 is journaled at 69 in a fixed housing 70 which may constitute part of the guard for the grinding wheel. A pin 71 carried by the shifter engages a spiral groove 72 formed in the bushing 73 whereby upon rotation of the shifter in one direction, the flange 74 on the end of the shifter will engage the annular groove 67, and then upon continued rotation the shifter 69 will move axially in one direction to cause axial movement of the clutch control member. This will cause engagement of one of the clutch members 55 or 64. Upon rotation of the shifter 68 in the opposite direction, the clutch control member will be moved axially in the opposite direction producing the reverse effect upon said clutches. Thus by means of this control, either one of the clutch members 55 or 64 may be engaged while the other one is held in a disengaged position.

The worm gears 51 are driven by individual worms 75 and 76 which, as shown in Figure 2, are integral with shafts 77 and 78 which are rotatably mounted in the member 25. The shafts have individual friction wheels 79 and 80 attached to the end thereof for engagement by a shiftable double cone friction member 81. The friction member 81 is integral with the sleeve 66 and the end of the sleeve has a shifter spool 82 attached thereto. A shifter 83' is provided for engaging and shifting the spool in the same manner of operation as the shifter 68.

In order to understand the function of the shifter 83', it must be remembered that during balancing, the parts 23 and 25 are rotating as a unit with the grinding wheel, and in order to impart rotation to the shafts 77 and 78, the friction member 81 is provided for alternate engagement with the discs 79 and 80 for holding the same against rotation. Spring pressed bearing pins have been shown seated axially in the shafts 77 and 78, yieldingly to resist axial thrust of disc 81 against their respective discs 79 and 80 and maintain proper frictional engagement of the parts. If the disc 81 is moved into frictional engagement with the disc 79 while the same is being bodily moved through a circle due to the rotation of member 25, then the disc 79 will be caused to rotate or roll around the periphery of the disc 81 in the manner of an epicycloid. Since the disc 79 is larger in diameter than the disc 81, the shaft 77 will be rotated less than one revolution for one revolution of the member 25, the fraction depending upon the ratio of the diameter of the disc 81 to the disc 79.

It will thus be apparent that the shaft 77 is caused to be power rotated by applying friction to the periphery of the friction member 79, and utilizing the rotating force of the member 25 to effect a relative rotary movement between the shaft 77 and the member 25. It should therefore be evident that when the clutch shifter 83' engages the spool 82, that it must hold the spool against rotation while axially shifting the same. To this end the shifter is made in two parts 84 and 85.

As shown in Figures 11 and 12, the part 85 has a pin 86 threaded therein and extending radially through a slot 87 in the member 84, and a cam groove 88 formed in the sleeve 83, as shown in Figure 13. As shown in Figures 2 and 12, a spring 89 is mounted between the members 84 and 85 tending to separate them in an axial direction. The pin 86 is held against movement in a direction parallel to the axis of the member 85 by the cam slot 88 in the fixed bushing 83, and therefore it may be said that the member 85 is stationary and that the spring 89 moves the part 84 in one direction relative to the part 85. A suitable set screw, as indicated in Figure 2, is provided to secure sleeve 83 in position and against rotation with respect to its supporting housing 96. The amount of this movement depends upon the amount of lost motion in the elongated slot 87, and this lost motion is sufficient to permit the flanges 90 and 91 to separate a distance slightly greater than the width of the annular groove 92 in the spool 82.

The part 85 has a manual control lever 93 attached to the end thereof, as shown in Figure 2, and upon rotation of this lever, the flanges 90 and 91 are forced into the annular groove 92 of the shifter 82 by virtue of the beveled edges formed on the flanges 90 and 91. As the handle 93 continues to rotate, the pin 86 will move in the spiral groove and thereby cause axial movement of all the connected parts including the spool 82 whereby the double cone friction disc 81 will engage either the disc 79 or the disc 80.

As shown in Figure 11, a spring 94 has one end attached to the pin 86 and the other end attached to a pin 95 fixed in the housing 96 for returning the parts to a neutral position when the handle 93 is released. The handle 93 has a pointer 97 which is normally held on neutral by the spring 94. When the handle 93 is rotated clockwise, as viewed in Figure 7, the clutch spool 82 is shifted to the left, as viewed in Figure 2, whereby the cone 81 moves into engagement with the cone 80 and the shaft 78 is caused to rotate in one direction. This shaft carries a gear 98 which intermeshes with a gear 99 carried by the shaft 77 whereby the shaft 77 will be caused to rotate in a direction opposite to the shaft 78. Thus the worms 75 and 76 will rotate in opposite directions, but the gears 51 will rotate in the same direction due to the fact that they are mounted on opposite sides of the respective worm gears.

If the handle 93 is rotated counterclockwise, the double cone 81 will move into engagement with the disc 79 and cause the worms 75 and 76 to reverse their direction of rotation thereby reversing the direction of rotation of the gears 51. Thus, the lever 93 determines the direction of simultaneous rotation of the gears 51.

A second handle 100, attached to the shifter 68, determines whether the clutch 64 will be engaged to effect angular adjustment of said weights, or the clutch 55 engaged to determine the amount of separation between the weights, or in other words, the amount of the balancing component necessary to offset the amount of unbalance in the wheel. If the handle 100 is rotated in a clockwise direction, as viewed in Figure 7, the shifter 65 will be moved toward the right, as viewed in Figure 10, and the clutch 55 will be engaged; whereby if it is rotated counterclockwise, the shifter 65 will move to the left, and the clutch 64 will be engaged.

When the mechanism is permanently attached to the grinding wheel, the adjustments effected by the handles 93 and 100 will be sufficient and nothing further need be done. In order to determine, however, when perfect balance has been obtained, it is desirable that some form of indicator be utilized which may be in the form of a tube 101 attached to the wheel guard 70, as shown in Figure 2, and containing a vibratory reed 102 which is resiliently supported within the tube in such a manner that the free end will move relative to a fixed reference mark on a glass 103 mounted in the end of the tube. For the purpose of tuning the reed 102 to vary its sensitivity, the reed is supported in an adjustable block 103'. The block is shifted by a screw 104' which is rotated by a knurled knob 105', the screw being fixed in the end wall of the tube.

When it is desired to utilize the mechanism for temporary attachment to a grinding wheel to balance the same, it is necessary to determine the angular position and the amount of the weighted material to be added, and in this case, the housing 96 containing the control levers 93 and 100 may be removed and the parts 65 and 66 provided with separate manually operable handles 104 and 105, as more particularly shown in Figure 14. The rotating housing 23 is provided with a pair of windows 106 and 107, and suitable indicia are provided for indicating the desired results.

In other words, as shown in Figure 8, the shaft 39, which determines the subtending angle between the weights, is provided with a gear 108 which intermeshes with a ring gear 109 supported for free rotation on the end of the housing 25.

This gear has a plate 110 attached thereto which, as shown in Figure 3, is divided into four quadrants 111, 112, 113 and 114, each quadrant being graduated in degrees from 0 to 90 and in a clockwise direction. The center boss 115 of the carrier 25 about which the plate rotates is also divided into four quadrants, each quadrant being graduated in the same manner.

When the shaft 39 is rotated, the plate 110 is rotated relative to the central boss 115 whereby the outer graduations 116 will move relative to the inner graduations 117. The window 106 is provided with a reference line 118, and the subtending angle is computed by subtracting the reading on the inner circle from the reading on the outer circle or plate. This computed angle will only be one-half of the total subtending angle because, although the plate 110 moves with one of the weights, it must be remembered that the other weight is being moved an equal amount but in the opposite direction. For explanatory purposes, let it be assumed that the two weights lie superimposed on the radial line 119 of Figure 3, and that the two "0" marks of the inner and outer circles of graduations are in alignment, as shown in that figure. The plate 110 has a limited movement of 90° as explained supra, and as the weights move out of alignment, the plate 110 will move counterclockwise relative to the center portion 115 through a total angle up to 90°.

If it is assumed that the weights are superimposed upon the radial line 119 when the parts are in the position shown in Figure 3, it will be evident that the weights are producing their maximum effectiveness in this position, and the resultant of their combined effect will lie on the radius 119. The angle of this resultant may be assumed to be 0°, and in order to indicate the same, an additional circle of graduations 120 are provided on the boss 115, with the "0" mark in registry with a hairline 121 on the window 107. This circle may be graduated up to 360° in a counterclockwise direction, or if desirable, may be graduated in opposite directions from the "0" mark up to 180°. In any case, the hairline 121 will lie on a prolongation of the radius 119, and cooperating reference marks 122 and 123 made on the plate 20 and the grinding wheel support 18, whereby the angle of relative movement between the carrier 25 and the frame 23, as determined through the window 107, may be laid off clockwise or counterclockwise from the reference mark 123 on the grinding wheel support to thereby locate the plane in which the balancing material is to be placed.

Although the grinding wheel may stop in any angular position after the same has been rotated to determine the amount of unbalance therein, it must be remembered that the frame 23 rotates with the support 18 and, therefore, regardless of the position in which the grinding wheel stops, the reading at the window 107 may be properly referred to the support 18. Since the carrier 25 and all the parts associated therewith, including the weights and the graduated plate, move relative to the frame 23 when the shaft 42 is rotated, it will be apparent that it is correct to assume that the graduation marks 120 move relative to the hairline 121. Thus, means have been provided for determining the amount of weighted material to be added after the balancing operation has been completed, and for determining the angular plane with respect to a predetermined reference mark on the grinding wheel support in which this material should be placed.

There has thus been provided an improved dynamic balancing mechanism which is very efficient in operation and which will accurately determine the amount of unbalance and the angle thereof.

What is claimed is:

1. In a dynamic balancing mechanism for the rotatable member of a machine tool, the combination of a support carried by said rotatable member, a pair of balancing members carried by said support, an internal gear and an external gear operatively connected to said balancing members, an interposed pinion in mesh with said gears, a rotatable shaft operatively connected to said pinion whereby upon rotation of said shaft said members will be caused to be moved toward or away from one another to thereby vary the balancing component, and means to utilize the rotation of said support for causing actuation of said shaft.

2. In a dynamic balancing mechanism for a machine tool having a rotatable part to be balanced, the combination of a frame attached to said part for rotation thereby, a carrier rotatably supported by said frame, a pair of balancing members mounted on said carrier, a pair of drive shafts journaled in said carrier, means to selectively utilize the rotation of said frame to effect rotation of said drive shafts, a first gear train actuable by one of said drive shafts for effecting relative displacement of said balancing members, and a second gear train actuable by the other drive shaft to effect relative movement between said carrier and said frame and thus angular displacement of the members as a unit.

3. In a dynamic balancing mechanism for a machine tool having a rotatable part to be balanced, the combination of a frame mounted on said part for rotation thereby, a carrier supported on said frame for independent movement relative thereto, a pair of balancing members mounted on said carrier, a pair of drive shafts journaled in said carrier, means to utilize the rotation of said frame to effect selective rotation of one or the other of said drive shafts, gearing operatively connected for effecting relative displacement between said balancing members, additional gearing operatively connected for effecting relative movement between said carrier and frame, individual clutches for selectively connecting said gearings to the respective drive shafts, and external means for controlling the shifting of said clutches.

4. In a dynamic balancing mechanism for a machine tool having a rotatable part to be balanced, the combination of a frame fixed with said part for rotation thereby, a rotatable carrier mounted in said frame, means interconnecting the frame and carrier for joint rotation, including an internal gear on said frame and an intermeshing gear on said carrier, a pair of counterbalancing weights mounted on the carrier, means for utilizing the rotation of the frame for moving said weights toward or away from each other, and additional means for utilizing the rotation of said frame for effecting rotation of said gear on said carrier to effect relative rotatable adjustment between said carrier and frame to change the relative position of said weights with respect to said carrier and without disturbing the angular relation therebetween.

5. In a dynamic balancing mechanism for the grinding wheel of a machine tool, the combination of a frame operatively connected to the grinding wheel for rotation thereby, a rotatable support carried by said frame for movement relative thereto, means interconnecting the frame and support for joint rotation, a pair of counterbalancing members carried by said support, independent coaxial shafts rotatably mounted on said support, gears supported on said shafts, clutches for connecting the gears to the respective shafts, one of said gears being connected to effect angular displacement between said members, means driven by the other gear to effect relative movement between said support and said frame, and means to effect alternate engagement of said clutches.

6. In a dynamic balancing mechanism for a machine tool having a rotatable part, the combination of a frame carried by said part for rotation thereby, a carrier rotatably supported on said frame, means interconnecting said carrier and frame for joint rotation, a pair of balancing weights mounted on said carrier for relative angular movement, separate gear trains mounted in the carrier for effecting relative angular movement between said weights, and for effecting relative movement between said carrier and said frame respectively, each of said trains having a driver, an external fixed support, means carried by said support for selectively engaging said drivers during rotation of said part to cause relative rotation of said drivers relative to the carrier, a graduated ring mounted on the carrier for movement relative thereto, means on the carrier cooperating with said graduated ring for indicating the relative adjustment of the ring and carrier, and means operable by one of said trains for effecting movement of said ring relative to the carrier whereby the angular relationship between said weights is indicated.

7. In a dynamic balancing mechanism, a member adapted to be mounted on and driven by the device to be balanced, a carrier supported by said member for rotation therewith and with respect thereto, balancing weight devices supported by the carrier for joint and independent rotation, a pair of serially arranged gear mechanisms for effecting adjustments of said balancing devices, a first control mechanism for determining the direction of actuation of the gear mechanism and a second selector mechanism for determining the joint or relative adjustment of the balancing devices in the preselected direction.

8. In a dynamic balancing mechanism for the rotatable part of a machine, the combination of a support connectible for rotation by said part, a pair of balancing weights carried by said support, a first mechanism for effecting relative angular adjustment of said weights, a second mechanism for effecting bodily adjustment of said weights as a unit while maintaining their angular relationship, motion transmitting connections to said mechanisms including reversible driving worms, a first means to determine the direction of actuation of the worms and a second means selectively determinative of the operative effect of the worms during a particular direction of rotation thereof.

HANS ERNST.
ALBERT H. DALL.